United States Patent Office 2,796,092
Patented June 18, 1957

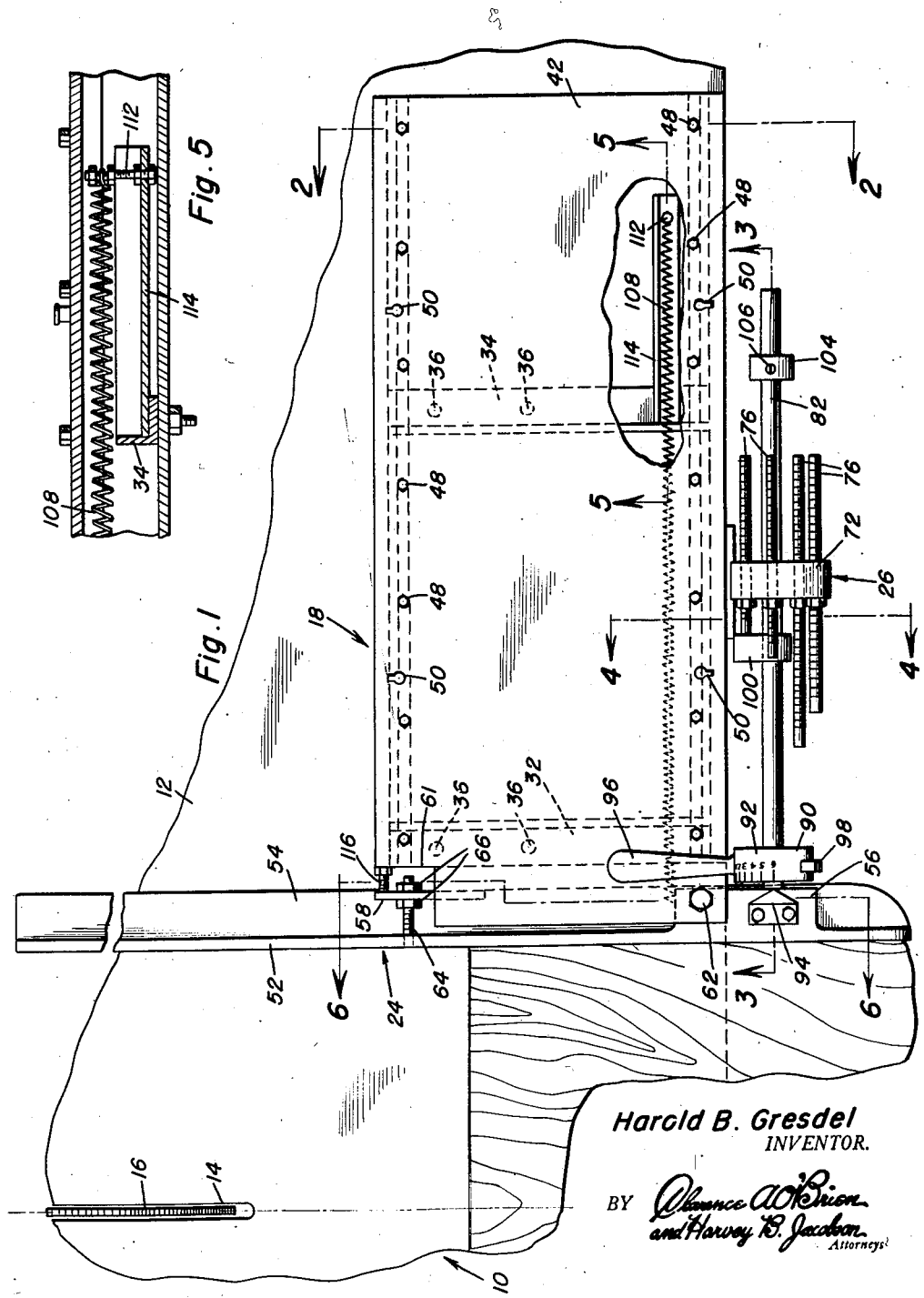

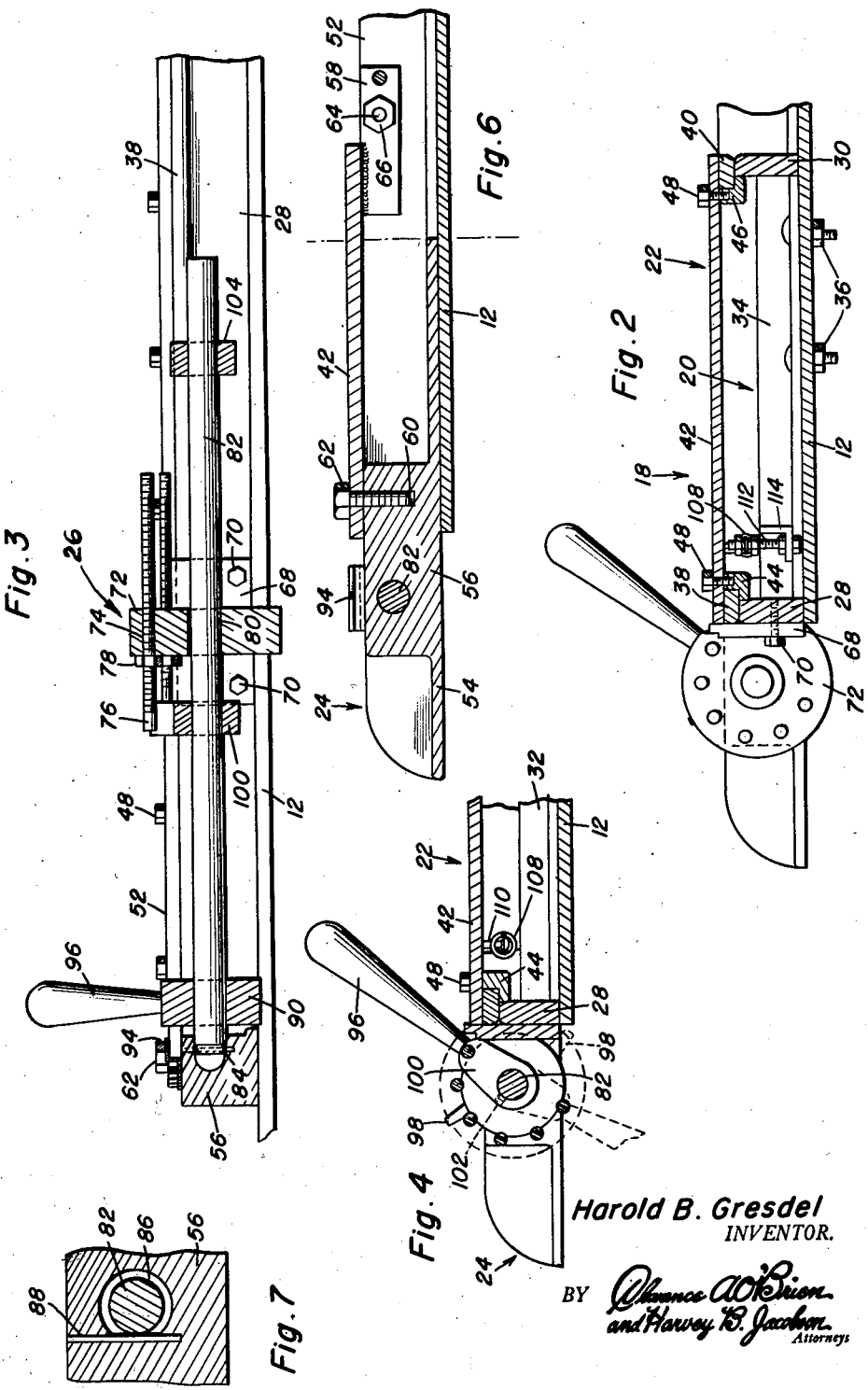

2,796,092

TABLE SAW SET WORKS

Harold B. Gresdel, Klamath Falls, Oreg.

Application August 11, 1955, Serial No. 527,770

1 Claim. (Cl. 143—174)

This invention relates in general to new and useful improvements in table saws, and more particularly to table saw set works.

A primary object of this invention is to provide an improved saw guide construction for use in conjunction with table rip saw machines, the saw guide being of such a nature whereby the position thereof may be quickly changed and at the same time may be accurately determined.

Another object of this invention is to provide an improved table saw set works which is so constructed whereby it may be conveniently mounted on the table of a conventional type of bent saw or table saw with a minimum of modification of the table.

A further object of this invention is to provide an improved table saw set works, the table saw set works including a guide carried by a carriage, the carriage being guidedly mounted on a base and there being provided adjustable stop means on the base and the guide whereby the guide may be quickly and accurately positioned with respect to the base and a table on which the base is mounted.

A still further object of this invention is to provide an improved adjustment for a table saw guide, the adjustment being formed of a plurality of stop pins arranged in a circular pattern and being of different lengths, there being selectively engageable with the stop pins a stop member, the particular engagement of the stop member with the stop pins determining the positioning of the saw guide.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary top plan view of a table of a table saw, there being mounted on the table the table saw set works which is the subject of this invention, the general details of the set works being illustrated;

Figure 2 is an enlarged transverse vertical sectional view taken substantially upon the plane indicated by the section line 2—2 of Figure 1 and shows the specific details of the base of the set works and the carriage slidably carried by the base;

Figure 3 is an enlarged longitudinal vertical sectional view taken substantially upon the plane indicated by the section line 3—3 of Figure 1 and shows the specific details of the mounting of the stop member and the relationship thereof with respect to certain of the stop pins;

Figure 4 is an enlarged fragmentary transverse vertical sectional view taken substantially upon the plane indicated by the section line 4—4 of Figure 1 and shows the specific relationship of the stop member with respect to the stop pins;

Figure 5 (sheet 1) is an enlarged fragmentary longitudinal vertical sectional view taken substantially upon the plane indicated by the section line 5—5 of Figure 1 and shows the manner in which one end of a tension spring is connected to the base;

Figure 6 is an enlarged fragmentary transverse vertical sectional view taken substantially upon the plane indicated by the section line 6—6 of Figure 1 and shows the specific details of the mounting of the guide with respect to the carriage; and Figure 7 is an enlarged fragmentary transverse vertical sectional view taken through one end of the shaft carrying the stop member and shows the manner in which the shaft is locked with respect to the guide against longitudinal movement and at the same time is mounted for freedom of rotation.

Referring now to the drawings in detail, it will be seen that there is illustrated a table saw which is referred to in general by the reference numeral 10. The table saw 10 includes a flat table 12 which has formed therein a slot 14. Projecting upwardly through the slot 14 is a saw blade 16. It is to be understood that the table saw 10 includes other components which are not illustrated. However, for the purpose of the present invention only those details of the table saw 10 described are a part.

Mounted on the table 12 adjacent the saw blade 16 is the table saw set works, which are the subject of this invention, the set works being referred to in general by the reference numeral 18. The set works 18 includes primarily a base, which is referred to in general by the reference numeral 20, a carriage, which is referred to in general by the reference numeral 22, a work guide, which is referred to in general by the reference numeral 24, and adjusting means, which are referred to in general by the reference numeral 26.

The base 20 includes a pair of transversely spaced, longitudinally extending rails 28 and 30. The rails 28 and 30 are connected together at one end by a transverse frame member 32. The rails 28 and 30 are also connected together intermediate their ends by a transverse frame member 34. The frame members 32 and 34 are preferably of angle iron construction and rest upon the table 12 and are rigidly secured thereto by suitable nut and bolt fasteners 36.

The rails 28 and 30 terminate at their upper edges in horizontal cap strips 38 and 40, respectively. The cap strips 38 and 40 project inwardly towards each other, as is best illustrated in Figure 2.

The carriage 22 includes a plate 42 which overlies and rests upon the cap strips 38 and 40. Secured to the plate 42 adjacent the opposite edges thereof are elongated L-shaped retaining strips 44 and 46. The retaining strips 44 and 46 are secured to the plate 42 by means of fasteners 48. The retaining strips 44 and 46 engage the cap strips 38 and 40, respectively, and restrain movement of the carriage 22 with respect to the base 20 to that which is longitudinal of the base 20.

Referring now to Figure 1 in particular, it will be seen that the plate 42 is provided with oil cups 50. The oil cups 50 are disposed in alignment with the cap strips 38 and 40 and serve to lubricate the same to facilitate the ease of sliding of the carriage 22.

The guide 24 includes an elongated straight edge 52 which is vertically disposed. The straight edge 52 extends transversely of the base 20 and the carriage 22 and is parallel to the saw blade 16. Secured to the lower edge of the straight edge 52 is a base flange 54 which projects towards the base 20. The guide 24 also includes a mounting block 56 disposed within the general confines of the straight edge 52 and the base flange 54 adjacent one end of the guide 24.

A mounting plate 58 is secured to the underside of the plate 42 adjacent the end thereof adjacent the guide 24. As is best illustrated in Figure 1, the mounting plate 58 is vertically disposed and is transverse to the longitudinal axis of the plate 42. The plate 42 is cut out as at 61 to provide for adjustment of fasteners to be described in more detail hereinafter.

Referring now to Figure 6 in particular, it will be seen that the mounting block 56 underlies the plate 42. Passing downwardly through the plate 42 and being threadedly engaged in an internally threaded bore 60 in the mounting block 56 is a pivot fastener 62. The guide 24 pivots about this pivot fastener 62.

Referring now to Figure 1 in particular once again, it will be seen that carried by the straight edge 52 in alignment with the mounting plate 58 is an adjusting screw 64. The adjusting screw 64 passes through the mounting plate 58 and is retained in adjusted position with respect thereto by a pair of lock nuts 66 disposed on opposite sides of the mounting plate 58. By adjusting the position of the screw 64, the straight edge 52 may be disposed in exactly parallel relation with respect to the saw blade 16.

The adjusting means 26 includes a mounting plate 68 (Fig. 3) which is secured to face-to-face engagement with the rail 28 by suitable fasteners 70. Carried by the mounting plate 68 intermediate its ends is a mounting block 72. The mounting block 72 is preferably circular in elevation, as is best illustrated in Figure 2, but may be of any desired shape. The mounting block 72 is disposed transversely to the rail 28. Formed in the mounting block 72 is a plurality of internally threaded bores 74. The bores 74 are arranged in a circular pattern and are spaced at equal distances. Threadedly engaged in each of the threaded bores 74 is an elongated stop pin 76. The stop pin 76 is retained in adjusted position with respect to the mounting block 72 by means of a lock nut 78.

Referring now to Figure 3 in particular, it will be seen that the mounting block 72 is provided with a central bore 80. Slidably received in the bore 80 is an elongated shaft 82. The shaft 82 has one end thereof journaled in the mounting block 56. The end portion of the shaft 82 is provided with an annular groove 84 in which is disposed a pin 88, as is best illustrated in Figure 7. The pin 88, which is carried by the mounting block 56, restrains the shaft 82 against longitudinal movement and at the same time permits freedom of rotation thereof.

Carried by the shaft 82 immediately adjacent the mounting block 56 is a dial member 90. The dial member 90 has formed on the periphery thereof a dial 92 (Fig. 1) which is alignable with a pointer 94 carried by the mounting block 56 to indicate the relative position of the shaft 82. The dial block 90 also carries a handle 96 to facilitate rotation of the shaft 82. A stop 98 projects from the dial block 92 and is engageable with the rail 28 to limit rotation of the shaft 82, as is best illustrated in dotted lines in Figure 4.

Adjustably secured on the shaft 82 for rotation therewith is a stop member 100. The stop member 100 is normally aligned with the handle 96, as is best illustrated in Figure 4, and is secured on the shaft 82 by means of a set screw 102. The end portion of the shaft 82 remote from the dial block 92 is provided with an adjustable stop collar 104 secured to the shaft 82 by means of a set screw 106.

In order that the carriage 22 may be normally urged to the right, as viewed in Figure 1, there is provided an elongated tension spring 108. The tension spring 108 has one end thereof anchored on the carriage 22 by means of a fastener 110 secured to the plate 42, as is best illustrated in Figure 4. The opposite end of the spring 108 is connected to a fastener 112. The fastener 112 is mounted on a bracket 114 carried by the frame member 34, the bracket 114 being best illustrated in Figure 1 and Figure 5.

The spring 108 serves to urge the carriage 22 to the right on the base 20. As the carriage 22 moves to the right, the guide 24, which is secured to the carriage 22 is also urged to the right. Movement of the guide 24 and the carriage 22 to the right, as viewed in Figure 1, is limited by engagement of the stop member 100 with the end of one of the stop pins 76, as is best illustrated in Figure 1. Movement of the carriage 22 and the guide 24 to the left is limited by an adjusting screw 116 carried by the rail 30, as is best illustrated in Figure 1. Likewise, movement of the guide 24 and the carriage 22 to the left, as viewed in Figure 1, is limited by engagement of the collar 104 with the block 72.

In the use of the present invention, the stop pins 76 are adjusted with respect to the block 72 so that they project a predetermined distance to the left of the block 72. Then when the stop member 100 engages the end of the stop pins 76, the straight edge 52 will be spaced from the saw blade 16 a distance to grip a board of a predetermined width. It is preferred that the pins 76 be staggered in even inches so that boards may be ripped at even inches. However, the arrangement of the pins 76 will depend upon the different sizes of the boards to be ripped with the saw 10.

In the operation of the present invention, when it is desired to shift the guide 24, the guide 24 is pulled to the left against the tension of the spring 108. Then the handle 96 is moved to rotate the shaft 82 in such a manner to align the stop member 108 with the desired one of the stop pins 76. The dial 92 is utilized in determining the positioning of the stop member 100. The carriage 22 and the guide 24 are then released and permitted to move to the right due to the urging of the spring 108. The movement of the guide 24 to the right will be limited by engagement of the stop member 100 with the particular stop pin 76 with which it is aligned.

From the foregoing description of the present invention, it will be readily apparent that the entire saw works may be conveniently mounted upon an existing table of a table saw by means of four simple fasteners, such as the nut and bolts 36. This will require only the drilling of four holes in the table 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A table saw set works comprising a base securable to a saw table, a carriage, said base including a pair of spaced parallel rails, transverse frame members interconnecting said rails, said carriage being in the form of an elongated plate resting on said rails for sliding movement thereon, retaining members on said plate engaging said rails and restricting vertical movement of said carriage relative to said base, a mounting block secured to one of said rails and projecting outwardly from said base, a plurality of bores through said mounting block, said bores being internally threaded and disposed parallel to said one rail, a plurality of stop pins, said stop pins being externally threaded with one of said stop pins extending through each of said bores, a work guide mounted at one end of said carriage and extending transversely thereof, a shaft rotatably carried by said work guide, a central bore in said mounting block, said shaft extending parallel to said one rail and passing through said central bore, said stop pins projecting from said mounting block towards said work guide different distances, a stop member carried by said shaft for rotation therewith, said stop pins being arranged in an arcuate pattern, means on said shaft for selectively aligning said stop member with one of said stop pins, spring means extending between said carriage and said base and urging said work guide towards said stop pins, and a stop collar on said shaft engageable with said mounting block to limit movement of said work guide away from said mounting block.

References Cited in the file of this patent

UNITED STATES PATENTS

| | | |
|---|---|---|
| 559,450 | Haskell | May 5, 1896 |
| 785,699 | Bemis | Mar. 21, 1905 |
| 793,111 | Von Culin | June 27, 1905 |
| 1,098,751 | Newton | June 2, 1914 |
| 1,295,587 | Peter | Feb. 25, 1919 |
| 1,737,131 | Tompkins | Nov. 26, 1929 |
| 1,800,450 | Hill | Apr. 14, 1931 |